Figure 1:
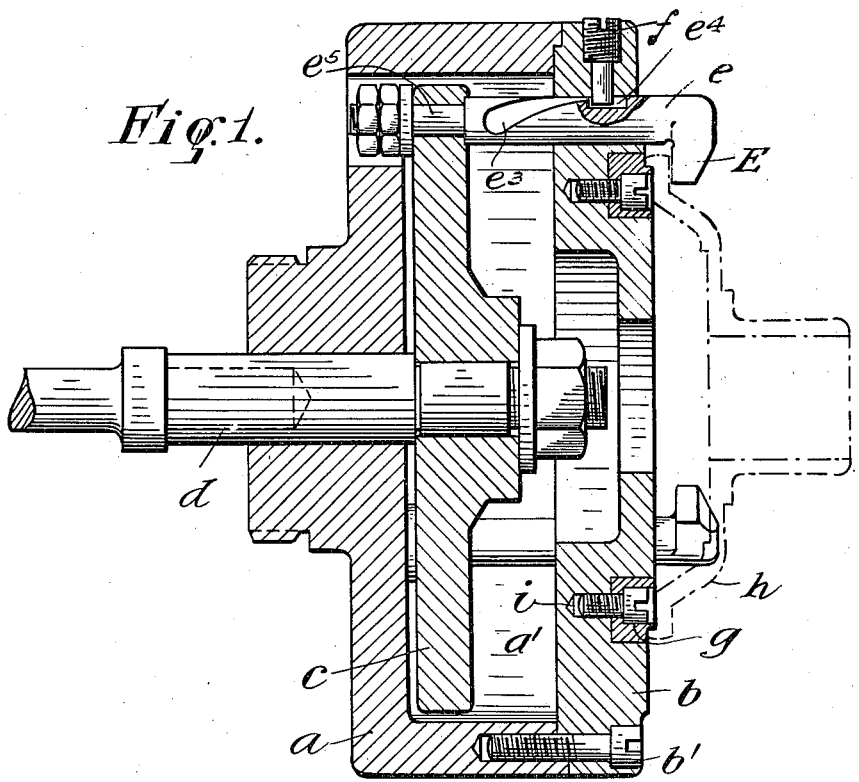

W. L. DIXON.
AIR OPERATED ADAPTER FOR CLAMPING WORK WHILE TURNING.
APPLICATION FILED NOV. 10, 1920.

1,412,170.

Patented Apr. 11, 1922.

INVENTOR
Walter L. Dixon
BY
Redding & Greeley
his ATTORNEYS

UNITED STATES PATENT OFFICE.

JAMES F. CREEL, OF APALACHICOLA, FLORIDA.

GLASS FOR MEASURING TURPENTINE TO BE DISTILLED FROM GUM.

1,412,169.  Specification of Letters Patent.  Patented Apr. 11, 1922.

Application filed September 27, 1919. Serial No. 326,945.

*To all whom it may concern:*

Be it known that I, JAMES F. CREEL, a citizen of the United States, residing at Apalachicola, in the county of Franklin and State of Florida, have invented certain new and useful Improvements in Glasses for Measuring Turpentine to be Distilled from Gum, of which the following is a specification, reference being had to the accompanying drawings.

This invention relates to an improved measuring glass for measuring or checking up the amount of turpentine to be distilled from each charge of gum in a still. In other words to provide a glass, by which the distiller may distill the gum by the rule of the measurements on the glass.

Figure 2:
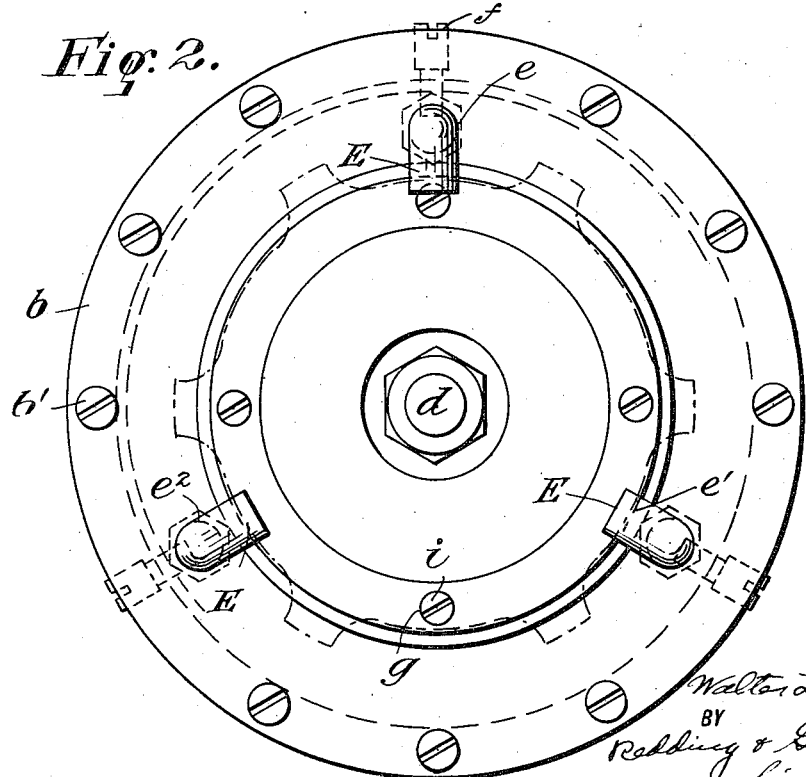

In the drawings:

Figure 1 is a perspective view of the improved measuring glass constructed in accordance with the invention; and Figure 2 is a vertical sectional view through the same.

Referring to the drawings, 1 designates a measuring glass as a whole, having a suitable handle 2. The exterior surface of the glass is graduated as shown at $2^a$, and is provided with a water line 3, upward from which the scale of graduations is read. Extending from certain of the graduations above the water line partially around the side of the glass are extension lines 4, 5 and 6, indicating the fact that there are five to ten gallons of spirits of turpentine in certain charges of gum. Adjacent these lines 4, 5 and 6 there are indications relating to the process of measuring spirits of turpentine relatively to a requisite amount of gum. These indications are engraved, etched or otherwise applied on the glass.

When distilling, the gum is placed in the still which is then closed, and as is well known the gum contains a certain amount of water, which is distilled out, by applying heat to the still. The water and spirits of turpentine will then flow at the same time from the worm, and while the gum is being distilled the water will decrease and the spirits of turpentine will increase. As this process is carried out the measuring glass is used to take samples from the worm at intervals, and when one of these samples shows the spirits of turpentine opposite the water line, the water being at the bottom, the glass may be filled, half water and half turpentine.

Water is then turned on through the funnel (not shown) into the kettle of gum, which will then flow a better stream of spirits of turpentine and water, and then the water increases and the spirits of turpentine decreases until all the spirits of turpentine is out of the gum, then the glass will be full of water, with a $\frac{1}{8}$ of an inch of spirits of turpentine floating on the top of the water in the glass at the turn outline, and unless all the spirits of turpentine is procured from the gum down to the $\frac{1}{8}$ of an inch of the turn outline, it will not be possible to secure $11\frac{1}{8}$ gallons of spirits of turpentine out of one barrel of gum weighing 500 pounds.

The main feature of the glass is to enable the distillers to operate stills by the scale of measurements on the glass, and by putting the water in at the right time, and when the water and spirits divide at the water line, the gum is distilled down to $\frac{1}{8}$ of an inch above the turn outline, which would give the full amount of spirits of turpentine in the gum.

It is to be noted that a stream of water is kept running in the still from the time the spirits of turpentine and water divide at the water line, until the turpentine is distilled off at the turn outline.

Also note that water is not first placed in the glass, but is received in the glass from the worm, while the still is operated. A one-half inch line will show to the distiller how many gallons to be procured out of the gum, while the one-quarter inch line will show the amount of spirits of turpentine remaining in the gum. The $\frac{1}{8}$ inch turn outline will indicate to the distiller that all the spirits of turpentine possible to be distilled from the gum, has been obtained.

As previously stated the main feature of the invention is that the distiller can operate the still by the scale of measurements upon the glass, by turning on the water at the right time and when the water and spirits of turpentine are divided at the water line and the gum may be distilled, until the spirits of turpentine will float upon the water at the $\frac{1}{8}$ inch turn outline.

The invention having been set forth, what is claimed as new and useful is:

1. A turpentine measuring glass, comprising a cylindrical hollow body and provided with uniform inside and outside diameters and having a wall of uniform thickness throughout its entirety, said body having on its exterior a water line substantially midway the height of the glass, a series of graduations on the side of the glass starting from a point adjacent the water line and ending at a point near the top edge of the glass, said graduations having extension lines for measuring the amount of spirits of turpentine.

2. As an article of manufacture, a turpentine measuring glass comprising a cylindrical hollow body of uniform inside and outside diameters, the exterior surface of the glass having a water line substantially midway the height of the glass, a portion of the exterior periphery of the glass being graduated upwardly from the water line, the upper portions of the graduations terminating in extension graduations indicating the proportion of gum to five and ten gallons of turpentine, said extension graduations also including a graduation known as a turn out line.

In testimony whereof I hereunto affix my signature.

JAMES F. CREEL.